United States Patent
Hiegler et al.

(10) Patent No.: US 10,292,248 B2
(45) Date of Patent: May 14, 2019

(54) METHOD FOR OPERATING A FIRST AND A SECOND LIGHT-EMITTING UNIT OF A MOTOR VEHICLE, AND CIRCUIT ARRANGEMENT

(71) Applicant: Automotive Lighting Reutlingen GmbH, Reutlingen (DE)

(72) Inventors: Michael Hiegler, Reutlingen (DE); Uwe Bormann, Heidenheim (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 17 days.

(21) Appl. No.: 15/744,931

(22) PCT Filed: Jun. 24, 2016

(86) PCT No.: PCT/EP2016/064716
§ 371 (c)(1),
(2) Date: Jan. 15, 2018

(87) PCT Pub. No.: WO2017/009023
PCT Pub. Date: Jan. 19, 2017

(65) Prior Publication Data
US 2018/0270937 A1  Sep. 20, 2018

(30) Foreign Application Priority Data

Jul. 15, 2015  (DE) .......................... 10 2015 213 291

(51) Int. Cl.
*H05B 37/03* (2006.01)
*F21S 41/141* (2018.01)
(Continued)

(52) U.S. Cl.
CPC ........... *H05B 37/03* (2013.01); *B60Q 11/005* (2013.01); *F21S 41/141* (2018.01);
(Continued)

(58) Field of Classification Search
CPC ............ H05B 33/0815; H05B 33/0827; H05B 33/0857; H05B 33/083; H05B 37/02;
(Continued)

(56) References Cited

U.S. PATENT DOCUMENTS 5,680,098 A   10/1997   Bejster et al.
6,583,570 B1   6/2003   Ito et al.
(Continued)

FOREIGN PATENT DOCUMENTS

DE   4041459 A1   7/1991
DE   10044194 A1   3/2001
(Continued)

OTHER PUBLICATIONS

Examination Report for German Patent Application No. 102015213291.9 dated Apr. 13, 2016.
(Continued)

*Primary Examiner* — Tung X Le
*Assistant Examiner* — Borna Alaeddini
(74) *Attorney, Agent, or Firm* — Howard & Howard Attorneys PLLC

(57) ABSTRACT

The invention relates to a method for operating a first and a second light-emitting unit of a motor vehicle. A first voltage converter is provided for operating the first light-emitting unit. A second voltage converter is provided for operating the second light-emitting unit. A switching unit is arranged between the two light-emitting units and the voltage converters, such that the second voltage converter is connected to the first light-emitting unit.

8 Claims, 2 Drawing Sheets

(51) Int. Cl.
  *B60Q 11/00* (2006.01)
  *H05B 37/02* (2006.01)
  *H05B 41/38* (2006.01)

(52) U.S. Cl.
  CPC ......... *H05B 37/0209* (2013.01); *H05B 41/38* (2013.01); *B60Q 2300/146* (2013.01)

(58) Field of Classification Search
  CPC ........................... H05B 37/00; H05B 41/2827; H05B 33/0818; H05B 33/0809; H05B 33/0824; H05B 33/0845; H05B 33/0851; H05B 37/04; H05B 39/10; H05B 33/0803; H05B 33/0821; H05B 33/0848; H05B 37/0209; H05B 37/0263; B60Q 11/002; B60Q 11/00; B60Q 1/0088; B60Q 1/38
  See application file for complete search history.

(56) References Cited

U.S. PATENT DOCUMENTS

| | | | | |
|---|---|---|---|---|
| 8,801,248 | B2* | 8/2014 | Brendle | F21S 41/147 362/516 |
| 2004/0056774 | A1 | 3/2004 | Schleicher | |
| 2011/0025215 | A1 | 2/2011 | Hulett | |
| 2011/0260643 | A1* | 10/2011 | Huang | G09G 3/3406 315/294 |
| 2012/0033333 | A1* | 2/2012 | Tsai | H02M 1/32 361/18 |
| 2012/0268011 | A1* | 10/2012 | Shiu | H05B 33/0815 315/121 |
| 2014/0218953 | A1 | 8/2014 | Ungru | |
| 2017/0231037 | A1* | 8/2017 | Briggs | H05B 33/0815 |
| 2017/0267175 | A1* | 9/2017 | Ichikawa | B60Q 1/04 |
| 2017/0359869 | A1* | 12/2017 | Ohta | B60Q 1/34 |

FOREIGN PATENT DOCUMENTS

| | | |
|---|---|---|
| DE | 10041888 A1 | 3/2002 |
| DE | 102005055009 A1 | 5/2007 |
| DE | 102009053581 B3 | 3/2011 |
| DE | 10109024 B4 | 2/2012 |
| DE | 102010050581 A1 | 5/2012 |
| DE | 102010050851 A1 | 5/2012 |
| DE | 102011005582 A1 | 9/2012 |
| DE | 102013113007 A1 | 5/2015 |
| EP | 1379108 A1 | 1/2004 |
| GB | 2240440 A * | 7/1991 ........... B60Q 11/002 |
| GB | 2240440 A | 7/1991 |

OTHER PUBLICATIONS

International Search Report and Written Opinion of the International Searching Authority for PCT International Application No. PCT/EP2016/064716 dated Aug. 16, 2016.

* cited by examiner

METHOD FOR OPERATING A FIRST AND A SECOND LIGHT-EMITTING UNIT OF A MOTOR VEHICLE, AND CIRCUIT ARRANGEMENT

CROSS-REFERENCE TO RELATED APPLICATIONS

The present application is a National Stage of International Patent Application No. PCT/EP2016/064716, filed on Jun. 24, 2016, which claims priority to and all the benefits of German Patent Application No. 102015213291.9, filed on Jul. 15, 2015, both of which are hereby expressly incorporated herein by reference in their entirety.

BACKGROUND OF THE INVENTION

1. Field of the Invention

The invention relates to a method for operating a first and a second light-emitting unit of a motor vehicle, as well as a circuit arrangement for operating the first and second light-emitting unit of a motor vehicle.

2. Description of the Related Art

A clocked voltage converter is known from DE 101 09 024 B4.

From DE 10 2010 050 851 A1, it is known that DC-DC converters generate an operating voltage for semi-conductor light sources from a vehicle electrical system voltage.

From DE 10 2009 053 581 B3, a light module is known that comprises several semi-conductor light sources arranged like a matrix.

In addition, it is known that each light-emitting unit of a motor vehicle headlight is assigned a respective voltage converter. Accordingly, a failure of a single voltage converter leads to the failure of the light-emitting function of the corresponding light-emitting unit.

SUMMARY OF THE INVENTION

Several voltage converters can be provided with similar properties for a headlight. Specific lighting conditions, for example generated by passing light, are necessary for safe driving, while other functions such as high beams are only switched on occasionally.

Hence, the invention addresses the problem of preventing a failure of a light-emitting function.

The problem the invention is based on is solved by a method for operating a first and second light-emitting unit of a lighting device of a motor vehicle, as well as by a circuit arrangement for the operation of a first and a second light-emitting unit. More specifically, the method includes the steps of providing a first voltage converter for an operation of the first light-emitting unit, and providing a second voltage converter for the operation of the second light-emitting unit, wherein the second voltage converter is connected to the first light-emitting unit by a switching unit arranged between the light-emitting units and the voltage converters. In addition, the present invention is directed toward a circuit arrangement for the operation of a first and a second light-emitting unit of a lighting device of a motor vehicle, wherein a first voltage converter is provided for an operation of the first light-emitting unit, and wherein a second voltage converter is provided for the operation of the second light-emitting unit, wherein a switching unit is arranged between the light-emitting units, whereby the second voltage converter can be selectively connected to the first light-emitting unit. Features that are important for the invention can further be found in the subsequent description and in the drawings, wherein the features both alone and in different combinations can be important for the invention, without making reference to this again explicitly.

Advantageously, as a result the first light-emitting unit can continue operating even in the event of a failure of an associated first voltage converter, which increases the road safety and driving readiness of the motor vehicle.

In one advantageous embodiment, an error with respect to the first voltage converter and/or with respect to the first light-emitting unit is determined, and depending on the determined error, the second voltage converter is connected to the first light-emitting unit. Advantageously, an energy supply of the first light-emitting unit can be ensured with this also when an error occurs.

In an advantageous embodiment, a sensor signal, in particular a current or a voltage, is determined between the first voltage converter and the first light-emitting unit. The error is determined in dependency on the sensor signal. Through the arrangement of the corresponding sensor between the first voltage converter and the first light-emitting unit for example through a target/actual comparison for one thing it can be determined whether the voltage converter is functioning correctly and for another thing it can be determined whether the light-emitting unit is function correctly.

In an advantageous embodiment, the second voltage converter has an operating parameter for the first light-emitting unit, in particular an output voltage of the voltage converter, prior to the connection of the second voltage converter to the first light-emitting unit. Advantageously, through this configuration an adaptation of the second voltage converter to the first light-emitting unit can occur. In an advantageous embodiment, the first light-emitting unit is assigned a higher operating priority than the second light-emitting unit. The second light-emitting unit is unplugged. Hence, in the event of a failure of a voltage converter which is assigned to a light-emitting unit which has a higher operating priority than another light-emitting unit, for example a passing light, in the event of a failure of the corresponding voltage converter it is possible to continue operating with a voltage converter of a high beam.

Additional features, possible applications and advantages of the invention arise from the following description of exemplary embodiments of the invention, which are presented in the drawing. In so doing, all described or represented features either separately or in any combination are the subject matter of the invention, regardless of their summary in the claims or their retroactive application as well as regardless of their formulation or presentation in the description or in the drawing. The same reference numerals are used for function-equivalent sizes and features in all of the figures, even in different embodiments.

BRIEF DESCRIPTION OF THE DRAWINGS

In the following exemplary embodiments of the invention are explained in greater detail with reference to the drawing. The figures in the drawing show the following.

DETAILED DESCRIPTION OF THE INVENTION

Figure 1:
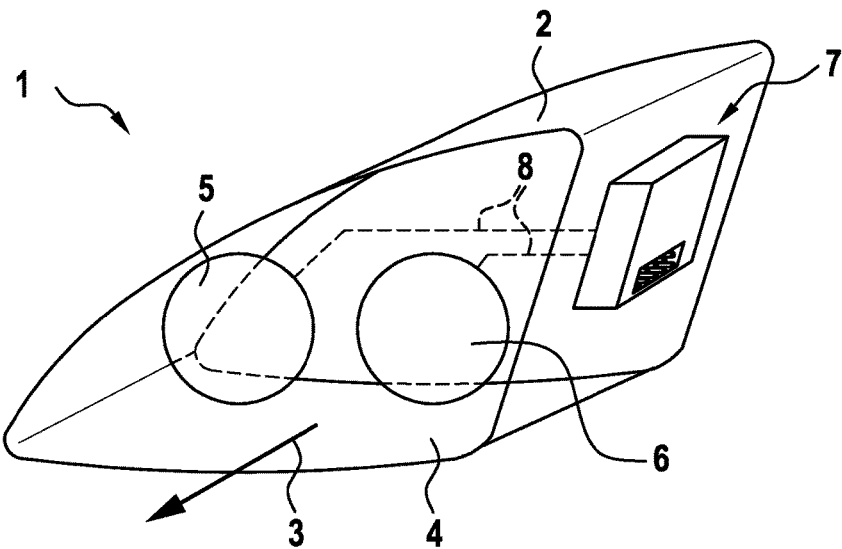
FIG. 1 shows a lighting device for a motor vehicle.

In FIG. 1, a lighting device for a motor vehicle is designated in its entirety with reference numeral 1. The lighting device 1 is representatively illustrated as a motor vehicle headlight. The headlight 1 comprises a housing 2, which is sealed by a transparent cover disk 4. The headlight housing 2 has a light emission opening in the light emission direction.

The headlight 1 comprises two light-emitting units 5 and 6, which produce the desired light distribution either alone or in combination with one another. The light-emitting units 5 and 6 can form a light module for example as reflection modules, projection modules or jointly.

A control device 7 is arranged on the exterior of the headlight housing 2. Alternatively, the control device 7 can also be an integral component of the light-emitting units 5 and 6. The activation of the light-emitting units 5 and 6 by the control device 7 occurs via connecting cables 8, which are shown symbolically in FIG. 1 by a dashed line. The light-emitting units are supplied with electrical energy via the cables 8.

The light-emitting units 5, 6 use one or more semiconductor light sources, in particular light-emitting diodes, as light sources. Headlights 1, which have a plurality of light-emitting diodes, are designated as pixel or matrix headlights. In these matrix headlights parts, in particular a single or several light-emitting diodes are dimmed or switched on or off in order to achieve different light distributions. With these matrix headlights, it is now possible to assign a first portion of the light-emitting diodes to the light-emitting unit 5, and to assign a second portion of the light-emitting diodes to the light-emitting unit 6.

For example, the light-emitting unit 5 is provided for the generation of a passing light and/or for the generation of a navigation light. The light-emitting unit 6 is provided for the generation of a daytime running light, high beam or some other light distribution. In this example, the first light-emitting unit 5 has a higher operating priority for the generation of priority light distributions compared to the light-emitting unit 6 due to its safety function.

Figure 2:
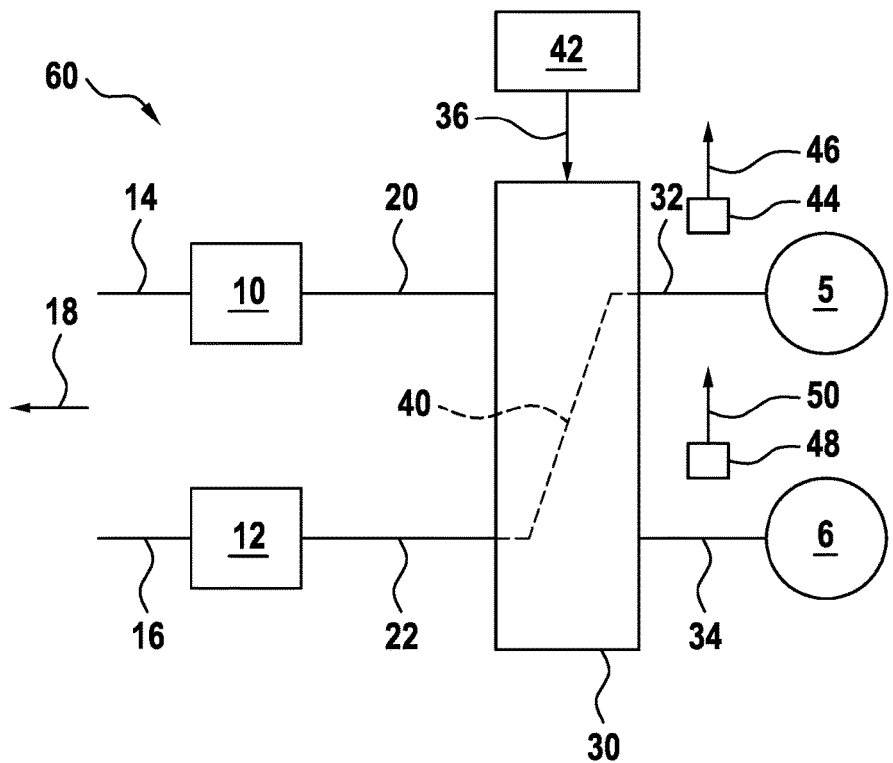
FIG. 2 shows a schematic block diagram.

FIG. 2 shows a schematic block diagram which in its entirety is referred to as circuit arrangement 60. A first voltage converter 10 is provided for an operation of the first light-emitting unit 5. A second voltage converter 12 is provided for the operation of the second light-emitting unit 6. The voltage converters 10 and 12 are each connected to the vehicle electrical system 18 of the motor vehicle via cables 14 and 16. Alternatively, the voltage converters 10 and 12 can also be connected to an intermediate voltage and thus to further components in the direction of the vehicle electrical system. On output cables 20 and 22, the voltage converters 10 and 12 generate a voltage level different from the input, said voltage level being able to be supplied to the respective light-emitting units 5 and 6. The output cables 20 and 22 are connected to a switching unit 30 which in normal operation connects the cable 20 to a cable 32 for the operation of the light-emitting unit 5 and connects the cable 22 to a cable 34 for the operation of the light-emitting unit 6.

During the reception of a trigger signal 36, the switching unit 30 opens the connection between the cables 20 and 32 and opens the connection between cables 22 and 34 and connects cables 22 and 32 in accordance with a connection path 40 in order to continue operating the light-emitting unit 5. Light-emitting unit 6 is unplugged here. The trigger signal 36 is generated by a monitoring unit 42, which detects an error in the region of the voltage converter 10 and or in the region of the light-emitting unit 5. In particular, errors in the region of the voltage converter 10 through the triggering of the connection path 40 advantageously do not result in the failure of the light-emitting unit 5.

A sensor 44 for detection of a sensor signal 46 is assigned to the cable 32. The sensor signal 46 can comprise a current or a voltage with respect to the cable 32. A sensor 48 for detection of a sensor signal 50 is assigned to the cable 34, wherein the sensor signal 50 is a current or a voltage with respect to the cable 34.

The sensor signals 46 and 50 are supplied to the monitoring unit 42. The monitoring unit 42 can perform a relative comparison of sensor signals 46 and 50. In addition, a comparison of the respective sensor signals 46 and 50 with the corresponding target value can occur. Depending on the evaluation of sensor signals 46 and 50 or one of the sensor signals 46 and 50 the trigger signal 36 is determined. Through the arrangement of the sensors 44 or 48 between the switching unit switching unit 30 and the respective light-emitting unit 5 or 6 advantageously it is possible to better distinguish between a malfunction of the light-emitting unit 5 or 6 and a further unit in the direction of the vehicle electrical system 18.

For example, if the light-emitting unit 5 generates a passing light distribution and light-emitting unit 6 generates a high beam distribution, by determining a reduction of a voltage below a pre-determined threshold on cable 32 by the sensor 44, a defect can be recognized and the path 40 can be activated. If the subordinate light-emitting unit 6 is not active at the time of the detection of the defect, then the voltage converter 10 is deactivated and the voltage converter 12 is activated for the operation of light-emitting unit 5, i.e. is switched for the operation of light-emitting unit 5. If the subordinate light-emitting unit 6 is switched on at the time of the detection of the defect, then it is switched off and the voltage converter 12 is deactivated and the voltage converter 12 is switched for the operation of light-emitting unit 5. Subsequently the light-emitting unit 5 is switched on and an error message is brought to the attention of the driver of the vehicle. A monitoring of the cable 34 does not necessarily have to occur for detection of the voltage drop, whereby the operation of lighting unit 5 can be securely maintained even if the high beam is switched off according to light-emitting unit 6. With this the voltage converter 12, which in normal operation of the high beam within the meaning of light-emitting unit 6 is provided as a reserve for the voltage converter 10 of the passing light 5. Thus in a failure of voltage converter 10 there is no longer any high beam available, which however is tolerated by the maintenance of a safe driving status by the active passing light function.

Of course, other examples are also conceivable for two differently prioritized light-emitting units 5 and 6. In the case of matrix headlights for example specified regions and/or specified light-emitting diodes can be assigned to the different light-emitting units 5, 6 and thus to different voltage converters 10, 12.

Figure 3:
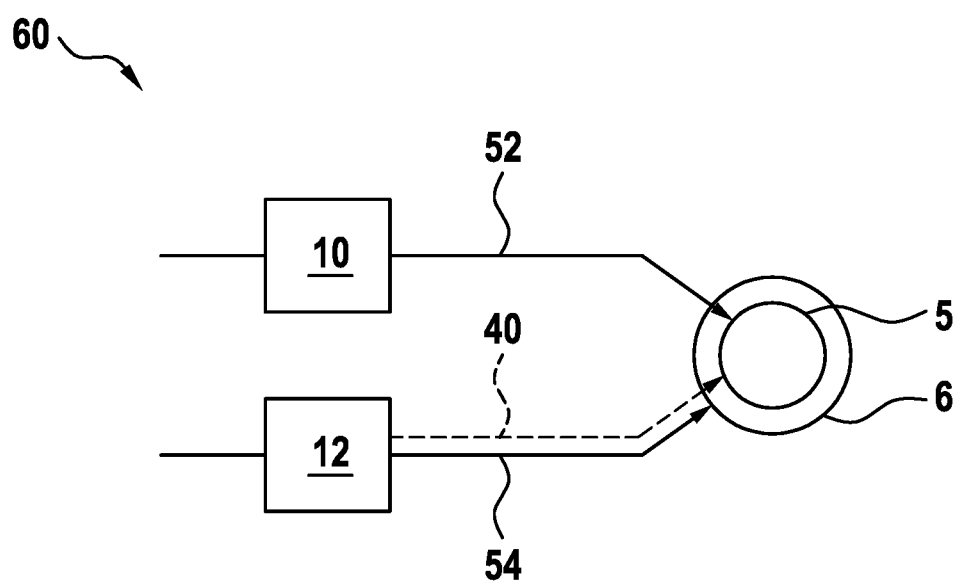
FIG. 3 shows another schematic block diagram.

FIG. 3 shows a block diagram in a further embodiment of the circuit arrangement 60. As an example, a schematic view shown against the direction of emission shows how the light-emitting unit 5 is arranged within light-emitting unit 6. The light-emitting unit 5 has a higher priority assigned to it than light-emitting unit 6, since the light distribution generated centrally by light-emitting unit 5 has a higher operating priority. Due to the method presented here or the circuit arrangement 60, in the event of a failure in the center of the headlight, i.e. in the region of light-emitting unit 5, the converter 12 in accordance with connection path 40 is used for operation of light-emitting unit 5. The light-emitting unit 6 is unplugged here. Connection paths 52 and 54 are used for normal operation of the headlight. In particular, the center of a matrix headlight in the form of light-emitting unit 5 is more important for the generated light distribution than the edge of the matrix headlight in the form of light-emitting unit 6.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A method for operating a first and a second light-emitting unit of a lighting device of a motor vehicle, said method including the steps of:
    providing a first voltage converter for an operation of the first light-emitting unit, and
    providing a second voltage converter for the operation of the second light-emitting unit,
    wherein the second voltage converter is connected to the first light-emitting unit by a switching unit arranged between the light-emitting units and the voltage converters;
    detecting an error with respect to the first voltage converter and/or with respect to the first light-emitting unit, and wherein depending on the detected error, the second voltage converter is connected to the first light-emitting unit.

2. The method as set forth in claim 1, wherein a sensor signal, in particular a current or voltage, is determined between the first voltage converter and the first light-emitting unit, and wherein the error is detected depending on the sensor signal.

3. The method as set forth in claim 1, wherein the second voltage converter has an operating parameter for the first light-emitting unit, in particular an output voltage of the first voltage converter, prior to the connection of the second voltage converter to the first light-emitting unit.

4. The method as set forth in claim 1, wherein the first light-emitting unit is assigned a higher operating priority than the second light-emitting unit, and wherein the second light-emitting unit is unplugged.

5. A circuit arrangement for the operation of a first and a second light-emitting unit of a lighting device of a motor vehicle, wherein a first voltage converter is provided for an operation of the first light-emitting unit, and wherein a second voltage converter is provided for the operation of the second light-emitting unit, wherein a switching unit is arranged between the light-emitting units, whereby the second voltage converter can be selectively connected to the first light-emitting unit, wherein an error with respect to the first voltage converter and/or with respect to the first light-emitting unit is selectively detected by a monitoring unit, and wherein depending on the detected error the second voltage converter is selectively connected to the first light-emitting unit.

6. The circuit arrangement as set forth in claim 5, wherein a sensor is arranged between the first voltage converter and the first light-emitting unit, wherein the sensor generates a sensor signal, in particular a voltage and/or a current is detected and supplied to the monitoring unit, and wherein the error is detected depending on the sensor signal.

7. The circuit arrangement as set forth in claim 5, wherein the second voltage converter includes an operating parameter for the first light-emitting unit, in particular an output voltage of the first voltage converter prior to connection of the second voltage converter to the first light-emitting unit.

8. The circuit arrangement as set forth in claim 5, wherein the first light-emitting unit is assigned a higher operating priority than the second light-emitting unit, and wherein the second light-emitting unit is unplugged.

* * * * *